(12) United States Patent
Gifford et al.

(10) Patent No.: US 9,652,813 B2
(45) Date of Patent: May 16, 2017

(54) RISK ANALYSIS ENGINE (71) Applicant: The Johns Hopkins University, Baltimore, MD (US)

(72) Inventors: Christopher M. Gifford, Laurel, MD (US); Jeffrey S. Brush, Montgomery Village, MD (US); Mark B. Gabriele, Westminster, MD (US)

(73) Assignee: The Johns Hopkins University, Baltimore, MD (US)

( * ) Notice: Subject to any disclaimer, the term of this patent is extended or adjusted under 35 U.S.C. 154(b) by 692 days.

(21) Appl. No.: 13/774,293

(22) Filed: Feb. 22, 2013

(65) Prior Publication Data
US 2014/0046863 A1    Feb. 13, 2014

Related U.S. Application Data (60) Provisional application No. 61/680,778, filed on Aug. 8, 2012.

(51) Int. Cl.
*G06Q 10/10*    (2012.01)
*G06Q 30/02*    (2012.01)
*G06Q 10/08*    (2012.01)
*G06Q 50/26*    (2012.01)

(52) U.S. Cl.
CPC .......... *G06Q 50/265* (2013.01); *G06Q 10/10* (2013.01)

(58) Field of Classification Search
CPC ............................. G06Q 10/10; G06Q 50/265
USPC .................................................. 705/1.1–912
See application file for complete search history.

(56) References Cited

U.S. PATENT DOCUMENTS

| | | | |
|---|---|---|---|
| 7,552,480 B1 | 6/2009 | Voss | |
| 7,577,623 B2 | 8/2009 | Genty et al. | |
| 7,743,421 B2 | 6/2010 | Cosquer et al. | |
| 7,783,500 B2* | 8/2010 | Meyer | G06Q 10/06 705/1.1 |
| 7,895,641 B2 | 2/2011 | Schneier et al. | |
| 7,913,303 B1 | 3/2011 | Rouland et al. | |
| 7,944,468 B2* | 5/2011 | Hoffman | G08B 13/19608 348/143 |
| 8,140,415 B2* | 3/2012 | Lawrence | G06Q 20/10 235/440 |
| 8,201,257 B1 | 6/2012 | Andres et al. | |
| 8,621,618 B1* | 12/2013 | Ramsey | H04L 63/1408 370/392 |
| 8,682,772 B2* | 3/2014 | Ziade | G06Q 40/00 283/57 |
| 2001/0027388 A1* | 10/2001 | Beverina | G06Q 20/203 703/22 |
| 2002/0099649 A1* | 7/2002 | Lee | G06Q 20/04 705/38 |
| 2005/0055308 A1* | 3/2005 | Meyer | G06Q 10/0635 705/38 |

(Continued)

*Primary Examiner* — Jonathan Ouellette
(74) *Attorney, Agent, or Firm* — Noah J. Hayward (57) ABSTRACT

In a risk analysis system, a risk analysis engine and a related method, incident information or activity information, which may be of a spatiotemporal nature, is analyzed. Behavioral patterns are identified in or derived from the incident information or the activity information. Observations are produced from matches of the behavioral patterns to behavior specifications. Based upon the observations, and asset vulnerability data, per-asset risks are derived.

17 Claims, 5 Drawing Sheets

(56) References Cited

U.S. PATENT DOCUMENTS

| | | | |
|---|---|---|---|
| 2005/0066910 A1* | 3/2005 | Tecott | A01K 29/005 119/421 |
| 2005/0183143 A1* | 8/2005 | Anderholm | G06F 11/32 726/22 |
| 2006/0236395 A1* | 10/2006 | Barker | G06F 21/552 726/23 |
| 2008/0001735 A1* | 1/2008 | Tran | G06F 19/3418 340/539.22 |
| 2008/0028470 A1 | 1/2008 | Remington et al. | |
| 2008/0148398 A1 | 6/2008 | Mezack et al. | |
| 2011/0206198 A1* | 8/2011 | Freedman | G06Q 30/06 379/265.03 |
| 2012/0079598 A1 | 3/2012 | Brock et al. | |
| 2012/0096558 A1 | 4/2012 | Evrard | |
| 2012/0197686 A1* | 8/2012 | Abu El Ata | G06Q 10/06393 705/7.39 |
| 2013/0282295 A1* | 10/2013 | White | G06F 19/345 702/19 |
| 2014/0089243 A1* | 3/2014 | Oppenheimer | G06F 21/50 706/46 |

\* cited by examiner

RISK ANALYSIS ENGINE

CROSS-REFERENCE TO RELATED APPLICATION

This application claims priority to and the benefit of U.S. Provisional Application No. 61/680,778 filed Aug. 8, 2012, the content of which is herein incorporated by reference in its entirety.

STATEMENT OF GOVERNMENTAL INTEREST

This invention was made with government support under contract number N00024-03-D-6606 awarded by the Naval Sea Systems Command. The government has certain rights in the invention.

BACKGROUND

Large amounts of information about threats, incidents, activities, risks and other concerns are collected, stored and analyzed by safety, security and intelligence agencies, including police, military, and homeland security. There is a known database that identifies key resources and critical infrastructures as assets to be protected. Traditional, human-based monitoring methods have been augmented by data mining, artificial intelligence, statistical analysis and other computer-driven techniques, which have been applied and continue to be developed in an ongoing effort to protect and ensure the safety and survival of the citizens and both public and private assets. The sheer volume of data and the changing nature of threats make this a daunting task which can easily overwhelm individuals and localized systems. Therefore, there is a need in the art for an integrated, flexible solution which overcomes the drawbacks described above.

SUMMARY

A risk analysis system, a risk analysis engine and a related method are herein described. Arriving incident information or activity information, which may pertain to risks to assets such as people and critical infrastructure, is analyzed so that per-asset risks can be determined.

In one embodiment, a method for risk analysis is disclosed. Incident information or activity information is analyzed. Behavioral patterns are identified, from analyzing the incident information or the activity information. Observations are produced from matches of the behavioral patterns to behavior specifications, which may be in a behavioral knowledge base. Per-asset risks are derived based upon the observations and asset vulnerability data. At least one of the method operations is executed through a processor.

In one embodiment, a computing device with a risk analysis engine is disclosed. The computing device includes a behavior discovery and suggestion subsystem, a predictive subsystem, a behavior management subsystem and a threat evaluation subsystem. Each of the subsystems includes computer-executable instructions stored in memory of the computing device. The behavior discovery and suggestion subsystem is configured to recognize behavioral patterns based upon analysis of incident information or activity information. The incident information or the activity information is of a spatiotemporal nature. The predictive subsystem is configured to estimate a next occurrence or a probable activity. Estimating the next occurrence or the probable activity is based on the behavioral patterns. The behavior management subsystem is configured to produce observations. The observations are from behavior specifications to which any of the behavioral patterns, estimated next occurrences or estimated probable activities conform. The threat evaluation subsystem is configured to assess per-asset risks on a spatiotemporal basis. Assessing the per-asset risks is based upon correlations between asset vulnerability data and the observations.

In one embodiment, a risk analysis system is disclosed. The system includes a gateway, a storage device and a processor. The gateway is configured to route incident information or activity information. The gateway is further configured to respond to queries requesting or regarding the incident or activity information. The storage device is configured to store asset vulnerability data. The processor is configured to communicate with the gateway and the storage device. The processor receives the asset vulnerability data from the storage device. The processor receives the incident information or the activity information through the gateway. The processor analyzes the incident information or the activity information. Behavioral patterns are derived from analysis of the incident information or the activity information. Observations are produced from behavior specifications and the behavioral patterns, by the processor. Per-asset risks are derived by the processor, based upon the asset vulnerability data and application of the observations as threat evidence.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
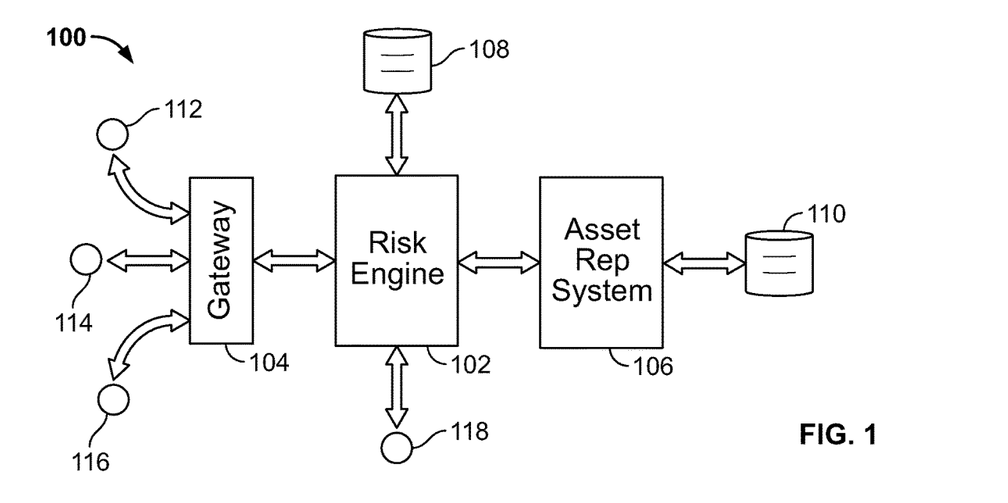
FIG. 1 is a block diagram of a risk analysis system in accordance with one or more example embodiments of the present invention.
Figure 2:
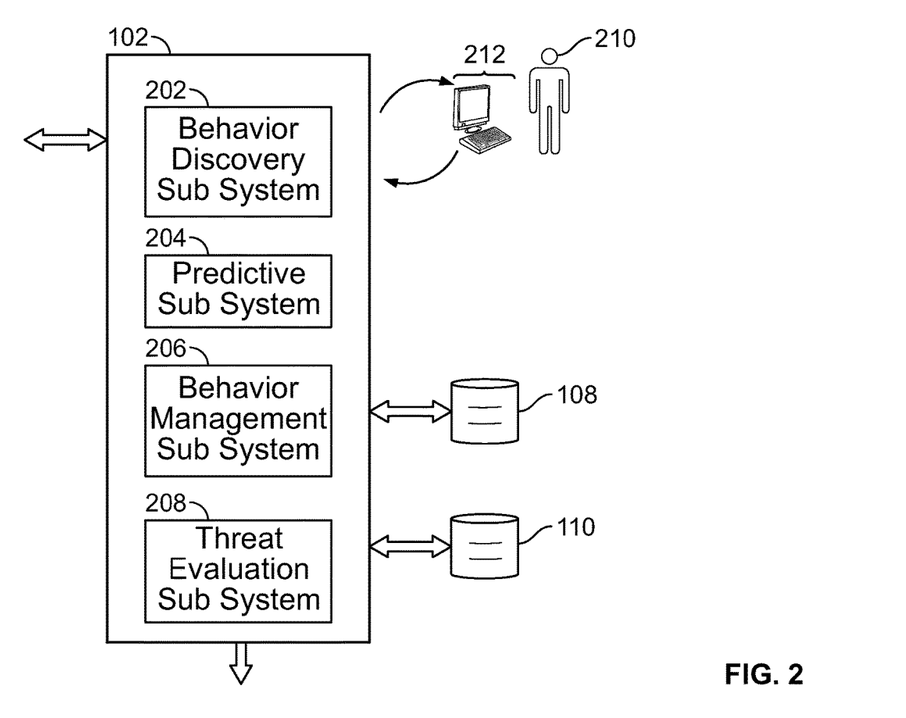
FIG. 2 is a block diagram of the risk analysis engine from the risk analysis system of FIG. 1.

A risk analysis system 100, shown in FIG. 1, a risk analysis engine 102, shown in FIGS. 1 and 2, and flow diagrams directed to methods relating thereto are presently described. The risk analysis engine 102 sits between "live" incoming event data and representations of assets, such as buildings, people and critical infrastructure, in the risk analysis system 100, and analyzes potential threats and risks to the assets. The system can issue reports and alerts 118, which may be acted upon by law enforcement, military, security or other personnel in order to protect the assets. Observations and factors leading to the observations can be tracked, for use by law enforcement and prosecution. Assets can be affected by special events, such as parades or appearances by politicians, celebrities or other well-known people. Assets affected by special events can be assigned a heightened risk for analysis purposes. The system can apply risk propagation, threat propagation, risk decay and/or various analytical techniques. A goal of the risk analysis system 100 is to automate processing of incident information or activity information to analyze risk to assets represented in asset vulnerability data.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 shows a risk analysis system 100, which includes a risk analysis engine 102 coupled to a gateway 104 and coupled to an asset representation system 106. Incident information or activity information arrives from various sources 112, 114, 116 via the gateway 104, and is received by the risk analysis engine 102. The incident information or activity information may include police reports, 9-1-1 or other emergency calls, intelligence reports, news items, anonymous tips, citizen reports, or other information about actual or suspected incidents or activities. Actual incidents or activities would be past or present, and suspected incidents are activities could be past, present or future. Of interest would be information leading to a possible threat or risk to an asset, which information is treated as a threat indicator. The risk analysis system 100 looks for behaviors of interest among the incident information or activity information, and links these behaviors to asset vulnerability information in the asset representation system 106, then looks for vulnerabilities of and consequences to the assets, and may output reports and alerts. A risk score may be calculated by the system, for each critical asset and infrastructure. With regular, frequent update cycles, a dynamic assessment of risk for an entire region such as a city, county, state or the country can be produced on an ongoing basis. Personnel can then decide how to apply and allocate resources to address risks indicated by the risk analysis system 100.

The gateway 104 can be implemented using one or more networks, a network portal, an Internet portal, one or more servers or combinations thereof, and connections to various sources of information, etc. The sources of information, which provide incident information or activity information, can be thought of as disparate threat data sources. The sources may be located in various places, have differing standards, formats or types of information, and have differing types of or permissions for access. The gateway 104 can route the incident information or activity information, and may respond to queries requesting or regarding the incident information or the activity information, e.g., by handling the queries or by routing the queries to appropriate sources 112, 114, 116 and routing the responses from the sources to the risk analysis engine 102. The gateway 104 can act as a translation layer, and even in some versions act as a filter preserving confidential or personal information, i.e., preserving or providing privacy, while providing identifiers and/or metadata for traceability. For example, when responding to a query, the gateway 104 could provide an answer that says yes, this does exist, it happened at this location and at this time or over this time span, but providing minimal other information. If a trace is later initiated, using an identifier, the gateway could then provide further information based upon permission and other requirements, e.g., a search warrant.

The asset representation system 106 stores, updates and otherwise maintains representations of assets in an asset representation database 110. This could be implemented on a server, or with a processor and a data storage device. Actual assets might include buildings, people, roadways, manufacturing plants, bodies of water, water treatment plants, electricity generating plants and substations, campuses, shopping malls, refineries, forests, and so on. However, assets are not limited to physical assets. The system can work for any concept of an asset as long as a notion of vulnerability to that asset can be created. One example of a non-physical asset would be a software system, which could be affected by a cyber attack. Assets can belong to groups in a hierarchy/taxonomy, and aggregate risk scores can be computed for these groups of Assets. A Sector of assets is an example of a group of assets that can have an aggregate score computed. The Sector taxonomy is also used in the process of determining asset relationships. Assets are represented using data in the asset representation database 110. The asset representation database 110 includes data about vulnerability of the assets, such as to what kind of threat an asset is vulnerable, how an asset could be attacked, destroyed, crippled, subverted or otherwise compromised, how likely this is to occur under what circumstances, and what the consequences, i.e., effects and repercussions of this would be, such as affected area, economic loss and/or loss of human life. Relationships among assets are also included in the asset representation database 110. Possible relationships include functional (e.g., multiple water treatment plants or a water treatment plant and a reservoir), dependency (e.g., gasoline service stations and oil refineries, or a manufacturing plant and a parts or materials supplier), direct, vulnerability, sector, and/or co-located (i.e., physically located nearby). Representations of the assets may include or be associated with numeric scores, parameters, equations, rules etc. One way to populate the asset representation database 110 with vulnerability data is for analysts to perform site assessments and enter data relating to the assets, relationships among the assets, consequences etc., and how to score all of these. Asset vulnerability data is searchable and can be accessed by the asset representation system 106. The risk analysis engine 102 can access the asset vulnerability data stored in the asset representation database 110, for example via the asset representation system 106. In a variation, the risk analysis engine 102 could include the asset representation database 110.

Arriving incident information or activity information is processed by the risk analysis engine 102, which generates, updates and maintains a behavioral knowledge base based on or from the incident information or activity information. The behavioral knowledge base is stored in the behavioral database 108, which can be accessed by the risk analysis engine 102. This will be further discussed regarding FIG. 2.

The risk analysis engine 102 processes information in the behavioral knowledge base, and produces observations. These observations may include observations of patterns and anomalies. The observations may be considered actionable information, and may include risk scores for assets, identifiers for traceability, and other data and/or metadata. The risk analysis engine 102 then analyzes the observations relative to the asset vulnerability data. In other words, the risk analysis engine 102 looks for whether and how the observations affect or might affect assets, and what the threats and risks to the assets might be. From the observations and the asset vulnerability data, the risk analysis engine 102 derives per-asset risks, i.e., derives what the risk is or might be on a per-asset basis. The risk analysis engine 102 can then issue reports or alerts 118, based on this analysis. The reports and/or alerts are also actionable information, and may include observations of various behaviors as related to various threats.

FIG. 2 shows internal details of the risk analysis engine 102. Embodiments of the risk analysis engine can be implemented in software, firmware or hardware or combinations thereof, using a processor, a computing device, a server etc. The risk analysis engine 102 has a behavior discovery subsystem 202, a predictive subsystem 204, a behavior management subsystem 206 and a threat evaluation subsystem 208, in the version shown in FIG. 2.

The behavior discovery subsystem 202 performs automated discovery and suggestion of novel behavioral patterns, as found in the incident information or activity information. Various algorithms monitor and evaluate threat data from data sources on a continual basis and may operate as background tasks. These algorithms look for behaviors and anomalies in the behaviors, and they produce observations. This can include observations of unique and/or related activities. In one version, discovered behaviors are suggested to a user, who then provides human feedback, thus supporting analyst-in-the-loop feedback. Examples of human feedback include having an analyst 210 initiate queries via a terminal or a computer 212 coupled to the risk analysis engine 102, to request information about various topics such as types of activities or activity at a particular location in a search for a pattern of activity. These queries can be handled through the gateway 104, shown in FIG. 1.

Continuing with FIG. 2, the predictive subsystem 204 leverages discovered and user-supplied behavioral patterns. Temporal patterns can be analyzed, e.g., for periodicity, to provide an estimate of a next occurrence, which may be useful in intervention. Sequential patterns can provide guidance on probable activity, which may be useful in intervention. In one version, partial sequences are analyzed by the predictive subsystem 204, which offers a completion estimate of a behavioral indicator, i.e., an extrapolation of the data to a next time point and location which would complete a partial sequence pattern. For example, if there is a four step sequence specified as a type of behavior to watch for, and there is an observation of a first step and a second step that the system recognizes as a match for part of the four step sequence, a report or an alert could be issued in time to intervene and prevent a third step or a fourth step from taking place.

The behavior management subsystem 206 constructs the behavioral knowledge base, which resides in the behavioral database 108. The behavior management subsystem 206 does this by forming behavior specifications, which provide templates for proposed matches from the incident information or activity information. Each behavior specification pertains to an incident, an activity, a pattern of incidents, a pattern of activities or other combination of data as relates to a behavior such as a threat behavior or a threat precursor behavior. The behavioral knowledge base may be constructed with user input or feedback. A user may indicate behavior specifications which are used to produce observations. As a specific example, an analyst may enter behavior specifications of what specific threats look like, from which the system then constructs observations based upon the incident information or activity information that matches the behavior specifications. Observations indicate when a specified behavior, from the behavior specifications, is observed in the incident information or activity information. Observations are produced from behavioral patterns, estimated next occurrences or estimated probable activities that match, fit, correlate with or otherwise conform to behavior specifications. The behavioral knowledge base may include precursor behaviors, indicator behaviors, asset-specific rules or activity sequences. Behavior queries may be applied to facilitate manual exploration of data sources. More will be explained with regard to observations in the discussions with reference to FIGS. 3-6.

The threat evaluation subsystem 208 employs the observations as threat evidence, takes the vulnerability data relating to an asset to which the threat evidence applies, then computes, calculates, derives or otherwise assesses the per-asset risks. It does this by looking through the asset representation database 110, particularly the asset vulnerability data stored therein, and finding vulnerabilities, consequences and relationships. The observations are analyzed as contributing risk to affected assets, which are represented in the asset representation database 110. In some versions, these risks or threats are propagated to other related assets, as will be further discussed. Contributing observations and events can be stored by the system for traceability and prosecution purposes.

Figure 3:
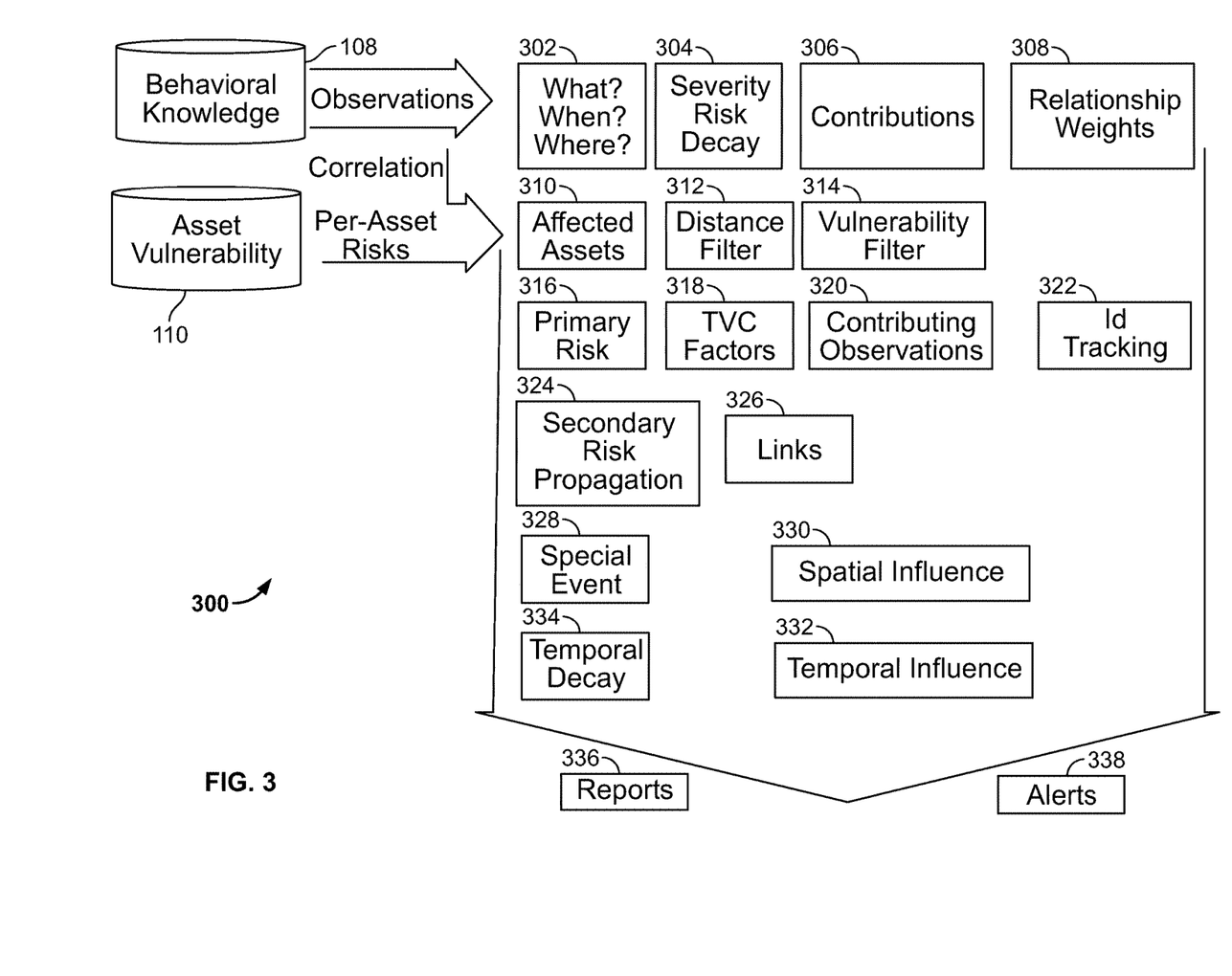
FIG. 3 is a data analysis and flow diagram showing operating factors of the risk analysis engine of FIG. 2.

FIG. 3 goes into more detail about how the risk analysis engine 102 works. It is understood that embodiments of methods in accordance with the following descriptions can be implemented using one or a combination of database analysis software, artificial intelligence programs, pattern matching software, Fourier analysis software, rule-based software, fuzzy logic software, neural net software and/or the firmware or hardware equivalents thereof. From the behavioral knowledge, in the behavioral database 108, come observations. These observations are of a spatiotemporal nature, i.e., the observations have time information such as calendar dates and timestamps or time duration notes, and spatial information such as location information, latitude and longitude or other coordinates and/or spatial extent such as length, width and height or other dimensional information. The spatiotemporal information associated with the observations may have hard or soft boundaries, i.e., be represented as having sharp boundaries or gradual or approximate boundaries. Observations of a spatiotemporal nature may answer or attempt to answer questions such as: what is it, when did it or might it occur, and where did it or might it occur, as represented in the factor box 302. Observations of a spatiotemporal nature can be formed from incident information or activity information, of a spatiotemporal nature.

Here are some examples of how the observations can be formed by the behavior discovery subsystem 202, the predictive subsystem 204 and/or the behavior management subsystem 206. Association rules can be applied to the incident information or activity information to recognize when one type of event and one type of situation or other event are associated with a likely outcome. An example of this is that when one type of bomb component is stolen and another type of bomb component is purchased at some other location, and these events are within a small window of time, it is possible that someone is going to assemble a bomb. Another example of this is that when a gun store is robbed and a large number of guns are stolen, someone is possibly planning a crime that will use a large number of guns, or the illegal market will soon be flooded with a large number of stolen guns. A decay factor may be applied so that the further apart these events or situations are in distance or in time, the lower the likelihood of the possible outcome. This analysis can be done with or without fuzzy logic and fuzzy association rules.

Pattern trees can be applied to analyze possibly connected events or incidents. Temporal pattern analysis can be applied to discover patterns happening over a period of time, which may be likely to recur or lead to a seminal event. Temporal spikes in a pattern can indicate a behavior. Periodic patterns can be transformed, e.g., with Fourier transforms or scaling, so that periodicities can be analyzed. Anomalies in patterns can be spotted using various techniques. Subsequences can be spotted in longer sequences. Sequence discovery algorithms can be applied, with or without graphical representation. Examples of patterns would be a series of bank robberies or burglaries at regular time intervals or over a span of geographic locations. From such a pattern, a next occurrence of a bank robbery or burglary can be suggested as an observation. A town that has not had a bank robbery but is in the vicinity of other towns that have had recent bank robberies could be indicated by pattern recognition. A sequence of bank robberies once per month or once per week can be analyzed to form the observation that a bank robbery might occur next month or next week. Another example of a pattern to be analyzed would be an incident of a vehicle turning around at an entrance to a secure facility. If it happens once, that's interesting. If it happens twice, and it's the same vehicle, that's more interesting. If it happens several times, that's even more interesting. The frequency of occurrence, i.e. how often this happens, can be a factor in calculating the risk score. A risk parameter would be adjusted accordingly, and the risk factor would decay as more time passes if the event is not repeated, or if related events of interest are not observed as occurring.

From the observations, and from the asset vulnerability data, the per-asset risks are derived. One way to do this is to correlate the observations with the asset vulnerability data, i.e., determine which assets are or might be affected by which observations, how the assets might be affected, and how likely this is to occur. All of this can be applied to calculate a risk score for a specified asset, based upon the observations, the asset vulnerability data, and various factors as individually applicable to a particular situation or set of circumstances at a given moment of time. This is what the various factor boxes 302-334 represent, and how they are applied by the risk analysis engine 102.

Following is an example, in which an observation is correlated with the asset vulnerability data, which will illuminate the analysis process and the factors involved. It is understood that the term "factors" is used to mean contributors to a situation or a result, in this case an assessment of risk, and that differing factors may be applied and in differing orders than in this example.

The observation, based on the incident information or activity information, is of a spatiotemporal nature and includes information answering questions of what, when and where as shown in the factor box 302. For example, spatiotemporal data can include one or more timestamps, latitude and longitude or other parameters indicating when an incident or activity occurred and where it occurred. Severity risk decay, as shown in a factor box 304, can be applied to decrease a risk score as a function of time, if applicable. For example, the risk of a terrorist attack could be very high leading up to the anniversary of September 11th, and be lower in the days and weeks after the anniversary. Contributions to risk for the correlated asset, as shown in a factor box 306, are analyzed. Relationship weights, as shown in a factor box 308, are applied to the calculation of risk to the correlated asset. In other words, if the observation has a large relationship weight, the risk is increased, and so on.

Affected assets, as shown in a factor box 310, are analyzed to determine if this is the only asset affected by the observation or if others might be affected. Selecting the affected assets includes determining if an asset is a target or a potential target, based upon the observed behavior i.e., the observation and what type of behavior it was and where it occurred. A distance filter, as shown in a factor box 312, is applied, e.g., to the risk calculation. Critical infrastructure that is nearby could be affected by an observation. For example, the further away an asset is from a specified observation, the lower the risk. This is not always so, and factors affecting the distance filter may be adjustable on a per-asset basis, as is generally true of factors affecting risk. Other assets that are the same type of asset could be affected by an observation, even if not located geographically nearby. An example of this would be water treatment plants, where if one water treatment plant is being targeted, another might be, and is considered an affected asset. A vulnerability filter, as shown in a factor box 314, is applied. For example, a hardened target may not be very vulnerable to small arms fire, but a soft target may be much more vulnerable.

A primary risk is determined, as shown in a factor box 316. The primary risk may be a calculation associated with the asset determined to be most affected or most likely to be affected by an observation. A threat component, a vulnerability component and a consequence component (TVC factors) can be applied, as shown in a factor box 318. Here, a risk score is produced, which may be normalized, by applying various factors in an equation that calculates the risk to the asset as associated with each factor. For example, this can be a primary risk score as applied to the primary risk. The threat component is a threat scoring mechanism for a specified asset and can apply severity, strength and prominence as factors. The vulnerability component is a vulnerability scoring mechanism for a specified asset and can apply importance level, component scores, mission-based scores, history-based scores, critical node scores, hazardous material scores, historical threat scores, response time and asset relationships and other calculations as factors. The consequence component is a consequence scoring mechanism for a specified asset and can apply importance level, component scores, asset relationships, average quantity of hazardous materials scores, consequence significance scores, consequence of loss of operations scores, consequence of replacement cost, consequence of economic impact and consequence of population impact as factors. There can be flexibility regarding how the system computes TVC factors and Risk overall. The analyst can specify weights and functions (potentially custom) that would be used to drive the Risk computing, propagation, etc. process. The analyst-driven weights may be called Custom Risk Profiles (which dictate how Threat, Vulnerability, and Consequence Risk components are computed and weighted, resulting in a configurable Risk strategy). The customizable equation to combine Threat, Vulnerability, and Consequence Risk components supports a Pluggable Risk Model.

Contributing observations, as shown in a factor box 320, can be determined and tracked with ID (identifier) tracking, as shown in a factor box 322. One way this can be done is by assigning respective identifiers to each chunk of incident information, to each chunk of activity information, to each observation, to each asset represented in the asset vulnerability data, to each behavioral specification in the behavioral knowledge base, and to each of the per-asset risks, including the primary risks. Then, identifiers associated with each observation that contributes to a risk, each asset associated with the risk, and each behavioral specification that contributes to the risk can be stored under a combined identifier associated with the per-asset risks, for each risk. In this manner, the observations and the incident information or activity information are traceable. A trace can be applied early, and appropriate queries initiated, to provide information useful in preventing an undesirable event such as a crime or an attack. A trace can be applied later, e.g., for follow-up investigation or prosecution, if a subsequent event is successfully prevented, or if unfortunately a subsequent event occurs. Traceability may thus be useful in law enforcement, security or military efforts before or after such an occurrence. Identifiers can also be used to separate observations from various pieces or types of information. Using identifiers instead of actual records both supports further investigation (as discussed here) as well as protects sensitive information (for example, during discovery in a lawsuit).

Secondary risk propagation, as shown in a factor box 324, may be applied. Risk propagation spreads risk throughout a network, i.e. risk from a specific asset that may be targeted is propagated among assets that are in some way related or connected. Here, assets that are in some manner linked with or associated with a primary risk are identified, as by applying the affected assets factor from the factor box 310. Links, as shown in a factor box 326, are explored so that the effects of a threat on a primary risk can be propagated to the secondary risk, based on relationships among the assets as shown in the asset vulnerability data. As an example, an attack on a water treatment plant as a primary risk would be propagated downstream to the populace that receives water from the water treatment plant, as the secondary risk, and/or propagated to other water treatment plants as secondary risks, each of which would receive a secondary risk score. Secondary risk propagation can be performed over multiple levels and depths, e.g., to various asset relationship links as well as number of relationships away one asset is to another. For instance, the number of relationships away one asset is from another is used to determine a weighted contribution of primary risk that a related asset receives via risk propagation. The links can be direct, for example when one asset is receiving directly from another asset, or links can show beneficiary relationships, for example when an asset is receiving a benefit from another asset but could receive a similar benefit from elsewhere.

Special events, as shown in a factor box 328, can be identified on a calendar basis or through news or other sources. Examples of special events include the aforementioned parades and personal appearances, also voting, holidays, anniversaries of tragedies or other significant events, protest or demonstration gatherings and so on. The spatial influence, as shown in a factor box 330, of the special event is determined. For example, the parade route is mapped out. The temporal influence, as shown in a factor box 332, of the special event is determined. For example, the gathering time, begin time and end time, and dispersal time of the parade are looked up or estimated. Temporal decay, as shown in a factor box 334, can be applied. Temporal decay represents a memory factor of the system, and is employed to model how long the system "remembers" a situation. For example, a crowd begins gathering before a parade, reaches peak attendance during the parade and takes a while to disperse after the parade. As another example, there may be violent protest for a time after a politician speech, or a concern about terrorist attack for a time span after a video is shown on the Internet. Risk is adjusted, e.g., on a daily basis or to some other timetable, to account for temporal decay of the risk based on these factors.

From the per-asset-risks, reports 336 or alerts 338 can be generated. For example, a report 336 could indicate a situation is developing or a pattern is being monitored. Reports can be general, as in showing the risk landscape, or specific to one or a number of the per-asset risks. An alert 338 could indicate there is a high probability of an imminent event. Per-asset-risks can also be displayed on a dashboard-like user interface, e.g., as graphical information superimposed on a map, shown on a monitor attached to a computer. Such a dashboard-like user interface could also be interactive, allowing initiation of queries or traces by clicking on a dot or other emblem or symbol indicating an incident, activity, or asset.

Figure 4:
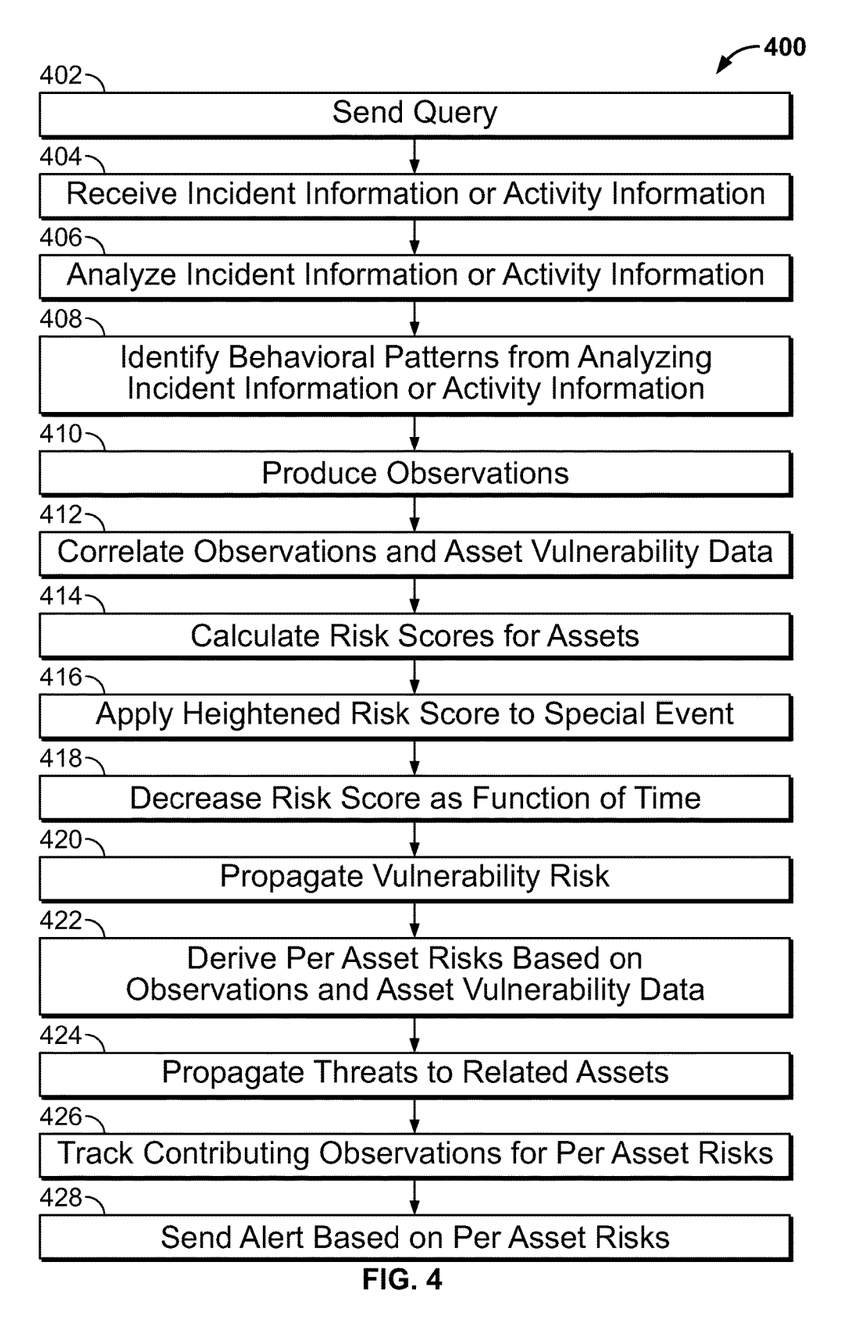
FIGS. 4-6 are flow diagrams showing embodiments of a method of operation of the risk analysis system of FIG. 1 and the risk analysis engine of FIG. 2.

FIG. 4 shows a method 400 for risk analysis, which may be practiced on embodiments of the risk analysis system 100 and the risk analysis engine 102. At least one of the method operations is executed through a processor.

In one operation 402, a query is sent. Incident information or activity information is received, in an operation 404. The incident information or the activity information is analyzed, in operation 406, for example by applying fuzzy logic or association rules, or by determining a pattern, a pattern tree, a temporal spike, a periodic temporal pattern or an anomaly in a temporal pattern. In operation 408, behavioral patterns are identified. The behavioral patterns are identified from analyzing the incident information or the activity information. The behavioral patterns may include time information and physical location information, from the incident information or the activity information. Observations are produced in operation 410, e.g., from matches of the behavioral patterns to behavior specifications in the behavioral knowledge base.

In operation 412, the observations and asset vulnerability data are correlated. Risk scores for the assets are calculated in operation 414, for each of the assets represented in the asset vulnerability data. In one version, the risk score is based upon a threat component, a vulnerability component and a consequence component. Risk normalization can be applied here. Assets can have various amounts of detail populated in the vulnerability/consequence database. Risk normalization, as a procedure, treats all of the assets on the same risk scale, computing a risk score from only vulnerability/consequence components for an asset that can be directly compared to other assets. The Risk normalization strategies also handle missing vulnerability and consequence data gracefully.

In operation 416, a heightened risk score is applied to a special event. More specifically, a heightened risk score is applied to assets affected by, influenced by or related to a special event, i.e., in the influence zone and/or with one or more relationships to some aspect of the special event. The special event is represented in the asset vulnerability data, which may include a time influence and/or a distance influence of the special event. For example, a special event such as a parade results in the roadway upon which the parade route proceeds receiving a risk score that is greater than when the parade is not present, and attending participants and spectators receiving a greater risk score than when the parade is not present.

In operation 418, a risk score is decreased as a function of time. This would be an application of temporal risk decay. Risk decay can be applied with respect to special event modifiers. In the general case, contributed risk from each observation decays in the absence of new information, at behavior-specification specific rates. Vulnerability risk is propagated, in operation 420. This can be performed by examining links among assets, i.e., looking for relationships among assets.

Per asset risks are derived, in operation 422, based on observations and the asset vulnerability data. Deriving the per-asset risks may be based upon correlation of the observations in the asset vulnerability data. Here, a per-asset risk confidence measure can be computed, based on the amount of vulnerability and consequence data present for an asset.

Threats are propagated to related assets, in an operation 424, for example based on the relationships among the assets. Contributing observations for the per-asset risks are tracked, in an operation 426. The observations may be tracked under an identifier. In an operation 428, an alert is sent based on the per-asset risks.

Figure 5:
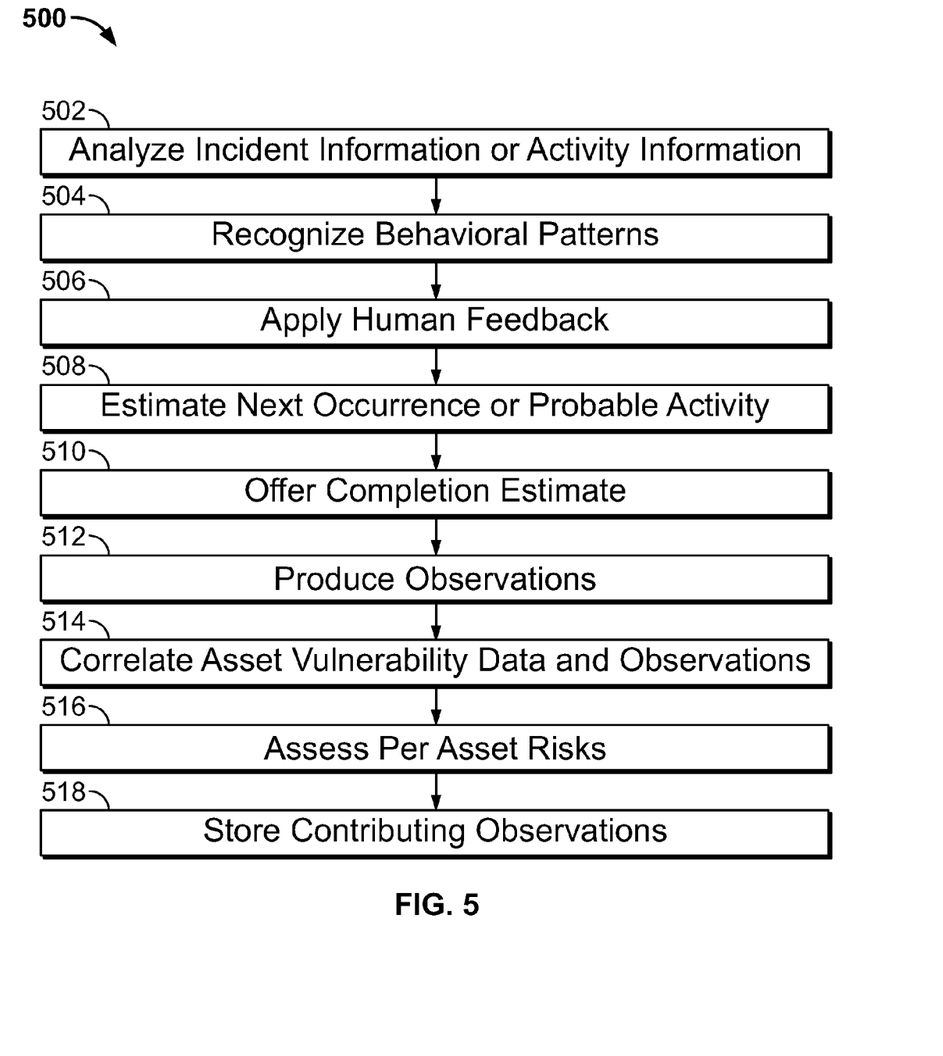

In FIG. 5, a method 500 for risk analysis is presented. The method may be practiced on a computing device that implements a risk analysis engine. Each of the subsystems of the computing device includes computer-executable instructions stored in memory of the computing device.

In an operation 502, incident information or activity information is analyzed. Behavioral patterns are recognized, in an operation 504, based upon analysis of the incident information or activity information. The incident information or the activity information is of a spatiotemporal nature. Human feedback is applied, in an operation 506, for example by an analyst who is kept in the loop.

An estimate is made of a next occurrence or a probable activity, in an operation 508, based upon the behavioral patterns. A completion estimate of behavioral indicators is offered in an operation 510, for example when an incomplete behavioral pattern is observed. The completion estimate of behavioral indicators may be based upon partial sequence matches in the behavioral patterns, and represent an estimate of when and how the behavioral pattern would be completed. Observations are produced, in an operation 512. The observations are produced from behavior specifications that are based upon the behavioral patterns, estimated next occurrences or estimated probable activities. The behavior specifications may be based on precursor behaviors, indicator behaviors, asset-specific rules and/or activity sequences. Asset vulnerability data in the observations are correlated in operation 514. Per-asset risks are assessed, in an operation 516, based upon the correlations between the asset vulnerability data in the observations. Contributing observations are stored in an operation 518. In a variation, the observations, the incident information or the activity information that contribute to the per-asset risks are stored, with an identifier.

Figure 6:
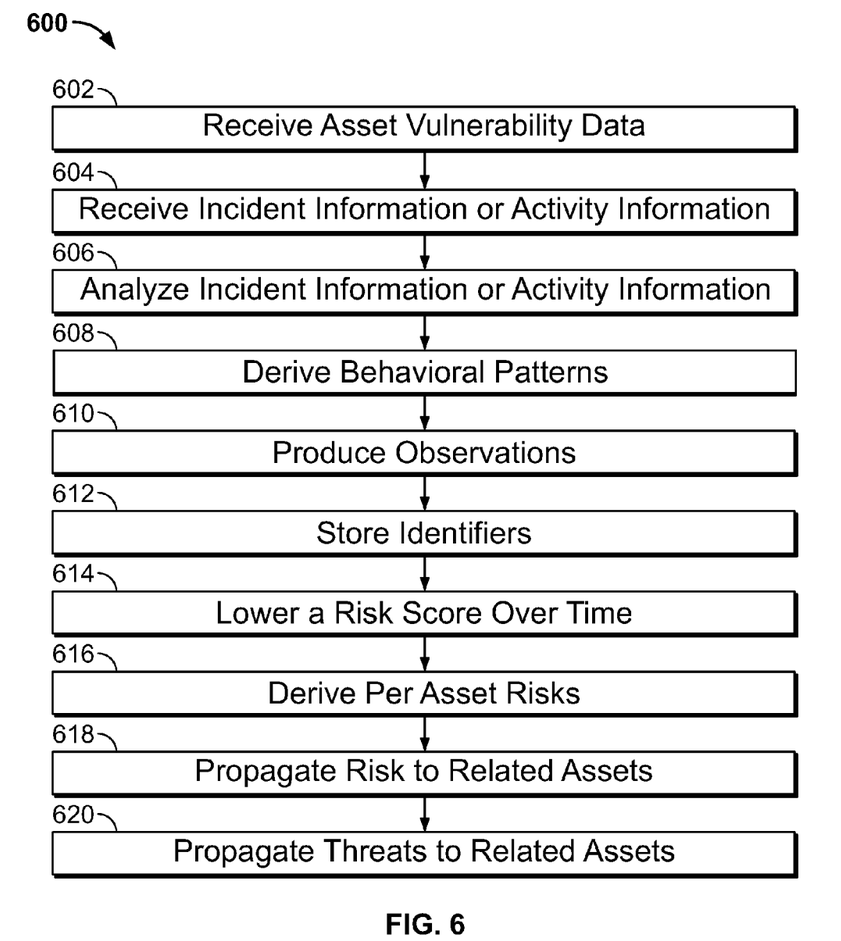

FIG. 6 shows a method 600 for risk analysis. The method 600 may be implemented on a risk analysis system that has a gateway, a storage device and a processor.

In an operation 602, asset vulnerability data is received from the storage device. Incident information or activity information is received through the gateway, in an operation 604. The incident information or the activity information is analyzed, in operation 606. In operation 608, behavioral patterns are derived, from analysis of the incident information or the activity information. Observations are produced, in operation 610, from behavior specifications and the behavioral patterns. Identifiers are stored, in operation 612, such that causes to a subsequent event are traceable. The identifiers are associated with the incident information or activity information, the behavioral knowledge base, the observations and the per-asset risks.

A risk score is lowered over time, in an operation 614. This is an example of risk decay. The risk score is applied to one of the per-asset risks. The per-asset risks are derived in an operation 616, based upon the asset vulnerability data and application of the observations as threat evidence. Risk is propagated to related assets in the asset vulnerability data, in an operation 618. Threats are propagated from the per-asset risks to the related assets, in an operation 620. These are examples of risk propagation and threat propagation, respectively.

Embodiments of the risk analysis system 100 and the risk analysis engine 102 can be flexibly operated, in that an analyst or other user can write and enter behavior specifications tailored to circumstances, interests or preferences. The analyst or user can initiate queries to bring in, update or otherwise add to information about assets, incidents and activities.

The role of queries and querying in the architecture is from the perspective of searching for instances of particular behavior specifications. Some examples follow. Analysts may describe behaviors that they are interested in monitoring, and their assessments about how severe the behaviors are and to what threats they may contribute. Those behavior specifications get internally translated to queries across the various data sets. The data sources are queried for matches (i.e., observations of the behaviors), and observation instances are returned that contain a reduced set of information, such as a data source and record combined ID, a location of matching instance(s), and the time they occurred. The risk analysis engine 102 captures, produces, sends, receives, stores, and processes the queries and associated results from the set of available data sources. The analysts specify the bulk of the detail based on what they care about as the initiation mechanism, but after that specification, the risk analysis engine 102 saves and continually monitors for those behaviors in the data. When behaviors are observed in the data, primary and secondary (i.e., propagated) risk is computed and assigned to affected assets. The process repeats itself The analyst also has the capability to enter one-time, exploratory queries that can then be used to obtain additional information or generate quick-action reports. Content of the queries depends on the data source being queried, but in general contains a description of a behavior in terms of field values or categories of field values in the data source(s). The gateway 104 is the piping that allows the risk analysis engine 102 to ask these questions of the data and get aggregated responses back for computing and assigning risk.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments can also be embodied as computer readable code on a computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for risk analysis, comprising:
analyzing, by a processor coupled to a memory, at least one of incident information and activity information;
identifying, by the processor, behavioral patterns by the analyzing of the one of incident information and the activity information;
producing, by the processor, observations of patterns and anomalies based on matches of the behavioral patterns to behavior specifications;
correlating, by the processor, the observations to asset vulnerability data to determine whether and how the observations affect a plurality of assets;
calculating, by the processor, a risk score for each of the plurality of assets based upon a threat component, a vulnerability component, and a consequence component;
deriving, by the processor, a per-asset risk for each of the plurality of assets based upon the correlation of the observations to the asset vulnerability data and by applying each risk score to each per-asset risk based on a common asset of the plurality of assets;
applying a distance filter to the calculation of each risk score to adjust that risk score based on a location of critical infrastructure with respect to the common asset; and
propagating a vulnerability risk and a threat from the common asset represented in the asset vulnerability data to each remaining asset of the plurality of assets, wherein the propagating of the vulnerability risk and the threat from the common asset is performed on each remaining asset in accordance with a weighted contribution of the vulnerability risk and the threat to that remaining asset.

2. The method of claim 1, wherein the behavioral patterns include time information and physical location information, from the incident information or the activity information.

3. The method of claim 1, wherein the behavior specifications act as templates for matches from the incident information or the activity information, with each behavior specification pertaining to one of: an incident, an activity, a pattern of incidents, and a pattern of activities.

4. The method of claim 1, further comprising:
tracking contributing observations for one of the per-asset risks, under an identifier.

5. The method of claim 1, further comprising:
applying the risk score to a special event represented in the plurality of assets of the asset vulnerability data.

6. The method of claim 1, wherein representation of a special event in the asset vulnerability data includes a time influence of the special event and a distance influence of the special event.

7. The method of claim 1, further comprising:
decreasing the risk score as a function of time, for an asset represented in the plurality of assets of the asset vulnerability data.

8. The method of claim 1, wherein analyzing the incident or activity information includes:
applying fuzzy logic;
applying association rules;
determining a pattern;
determining a pattern tree;
determining a temporal spike;
determining a periodic temporal pattern; or
determining an anomaly in a temporal pattern.

9. The method of claim 1, wherein the propagating of the vulnerability risk and the threat from the common asset is further performed on each remaining asset in accordance with a number of relationships that that remaining asset is away from the common asset.

10. A computer program product, the computer program product comprising a computer readable storage medium having program instructions for risk analysis embodied therewith, the program instructions executable by a processor to cause the processor to operate:
   a behavior discovery and suggestion subsystem, configured to recognize behavioral patterns based upon one of analysis of incident information and activity information, of a spatiotemporal nature;
   a predictive subsystem, configured to estimate one of a next occurrence and a probable activity, based upon the behavioral patterns;
   a behavior management subsystem, configured to produce observations of patterns and anomalies based on behavior specifications to which any of the behavioral patterns, the estimated next occurrences, and the estimated probable activities conform; and
   a threat evaluation subsystem, configured to:
      correlate the observations to asset vulnerability data to determine whether and how the observations affect a plurality of assets,
      calculate a risk score for each of the plurality of assets based upon a threat component, a vulnerability component, and a consequence component,
      derive a per-asset risk for each of the plurality of assets on a spatiotemporal basis, based upon correlations between asset vulnerability data and the observations and by applying each risk score to each per-asset risk based on a common asset of the plurality of assets,
      apply a distance filter to the calculation of each risk score to adjust that risk score based on a location of critical infrastructure with respect to the common asset, and
      propagate a vulnerability risk and a threat from the common asset represented in the asset vulnerability data to each remaining asset of the plurality of assets, wherein the propagating of the vulnerability risk and the threat from the common asset is performed on each remaining asset in accordance with a weighted contribution of the vulnerability risk and the threat to that remaining asset.

11. The computer program product of claim 10, wherein the behavior specifications are further based upon at least one selected from a group consisting of: precursor behaviors, indicator behaviors, asset-specific rules, and activity sequences.

12. The computer program product of claim 10, wherein the behavior discovery and suggestion subsystem is further configured to apply human feedback to the behavioral patterns.

13. The computer program product of claim 10, wherein the predictive subsystem is further configured to offer a completion estimate of behavioral indicators based upon partial sequence matches in the behavioral patterns.

14. The computer program product of claim 10, wherein the subsystems are further configured to store one of the observations, the incident information, and the activity information that contribute to the per-asset risks, with an identifier.

15. A risk analysis system, comprising:
   a gateway configured to route at least one of incident information and activity information and respond to at least one of queries requesting the one of incident and activity information and regarding the one of incident and activity information;
   a tangible, non-transitory storage device configured to store asset vulnerability data; and
   a processor configured to communicate with the gateway and the storage device, the processor coupled to a memory storing program instructions, the program instructions executable by the processor to cause the processor to:
      receive the asset vulnerability data from the storage device;
      receive the one incident information and the activity information through the gateway;
      analyze the one of the incident information and the activity information;
      derive behavioral patterns from the analysis of the one of the incident information and the activity information;
      produce observations of patterns and anomalies based on the behavior specifications and the behavioral patterns;
      correlate the observations to asset vulnerability data to determine whether and how the observations affect a plurality of assets;
      calculate a risk score for each of the plurality of assets based upon a threat component, a vulnerability component, and a consequence component;
      derive a per-asset risk for each of the plurality of assets based upon the correlation of the observations to the asset vulnerability data and by applying each risk score to each per-asset risk based on a common asset of the plurality of assets;
      apply a distance filter to the calculation of each risk score to adjust that risk score based on a location of critical infrastructure with respect to the common asset; and
      propagate a vulnerability risk and a threat from the common asset represented in the asset vulnerability data to each remaining asset of the plurality of assets, wherein the propagating of the vulnerability risk and the threat from the common asset is performed on each remaining asset in accordance with a weighted contribution of the vulnerability risk and the threat to that remaining asset.

16. The risk analysis system of claim 15, wherein the program instructions are further executable by the processor to cause the processor to lower a risk score over time, as applied to one of the per-asset risks.

17. The risk analysis system of claim 15, wherein the program instructions are further executable by the processor to cause the processor to store identifiers associated with the one of the incident information and the activity information, the behavioral knowledge base, the observations, and the per-asset risks to support tracing causes to a subsequent event.

* * * * *